US011875235B2

(12) United States Patent
Ahmed et al.

(10) Patent No.: US 11,875,235 B2
(45) Date of Patent: Jan. 16, 2024

(54) MACHINE LEARNING VOLTAGE FINGERPRINTING FOR GROUND TRUTH AND CONTROLLED MESSAGE ERROR FOR MESSAGE AND ECU MAPPING

(71) Applicant: Intel Corporation, Santa Clara, CA (US)

(72) Inventors: Shabbir Ahmed, Beaverton, OR (US); Christopher Gutierrez, Hillsboro, OR (US); Marcio Juliato, Portland, OR (US); Qian Wang, Portland, OR (US); Vuk Lesi, Cornelius, OR (US); Manoj Sastry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 247 days.

(21) Appl. No.: 17/024,232

(22) Filed: Sep. 17, 2020

(65) Prior Publication Data

US 2021/0004725 A1  Jan. 7, 2021

(51) Int. Cl.
*G06N 20/00* (2019.01)
*G06F 21/55* (2013.01)
*G06N 5/04* (2023.01)

(52) U.S. Cl.
CPC .......... *G06N 20/00* (2019.01); *G06F 21/554* (2013.01); *G06N 5/04* (2013.01); *G06F 2221/034* (2013.01)

(58) Field of Classification Search
None
See application file for complete search history.

(56) References Cited

U.S. PATENT DOCUMENTS

| 10,824,720 | B2* | 11/2020 | Ruvio ............... H04W 12/122 |
| 11,507,657 | B2* | 11/2022 | Gribelyuk ........... G06F 21/552 |
| 11,509,499 | B2* | 11/2022 | Stein .................. G06N 20/20 |
| 11,536,671 | B2* | 12/2022 | Beckett ............... G06N 20/00 |
| 11,593,717 | B2* | 2/2023 | Bhogal .............. G06V 10/774 |
| 2009/0037351 | A1* | 2/2009 | Kristal ................. G09B 7/06 706/12 |
| 2013/0081106 | A1* | 3/2013 | Harata ............... G06F 21/554 726/2 |
| 2013/0318607 | A1* | 11/2013 | Reed ................. G06F 11/3062 726/23 |

(Continued)

FOREIGN PATENT DOCUMENTS

WO  2018013171 A1  1/2018

OTHER PUBLICATIONS

Choi et al., "VoltageIDS: Low-Level Communication Characteristics for Automotive Intrusion Detection System" IEEE Transactions on Information Forensics and Security, vol. 13, No. 8, Aug. 2018, 16 pages.

(Continued)

*Primary Examiner* — Michael W Chao
(74) *Attorney, Agent, or Firm* — Schwegman Lundberg & Woessner, P.A.

(57) ABSTRACT

Systems, apparatuses, and methods to establish ground truth for an intrusion detection system using machine learning models to identify an electronic control unit transmitting a message on a communication bus, such as an in-vehicle network bus, are provided. Voltage signatures for overlapping message identification (MID) numbers are collapsed and trained on a single ECU label.

25 Claims, 8 Drawing Sheets

(56) References Cited

U.S. PATENT DOCUMENTS

| | | | | |
|---|---|---|---|---|
| 2014/0333323 | A1* | 11/2014 | Kabler | G01R 21/06 324/511 |
| 2014/0333324 | A1* | 11/2014 | Kabler | G06Q 50/06 324/537 |
| 2015/0185262 | A1* | 7/2015 | Song | G06N 20/10 702/64 |
| 2016/0173513 | A1* | 6/2016 | Rohde | H04L 63/126 726/23 |
| 2018/0285773 | A1* | 10/2018 | Hsiao | G06Q 30/04 |
| 2018/0351994 | A1* | 12/2018 | Tian | H04L 63/102 |
| 2018/0367554 | A1* | 12/2018 | Allouche | G06F 21/554 |
| 2019/0028500 | A1* | 1/2019 | Lee | H04L 12/40032 |
| 2019/0245872 | A1* | 8/2019 | Shin | H04L 12/40 |
| 2019/0317458 | A1* | 10/2019 | Shrivastava | G05B 13/0265 |
| 2019/0354810 | A1 | 11/2019 | Samel et al. | |
| 2020/0143049 | A1* | 5/2020 | Kamir | H04L 67/12 |
| 2020/0176112 | A1 | 6/2020 | Sati et al. | |
| 2021/0044444 | A1* | 2/2021 | Shukla | G06F 1/3206 |
| 2021/0065053 | A1* | 3/2021 | Higgins | G06F 9/542 |
| 2021/0201190 | A1* | 7/2021 | Edgar | G06N 20/00 |
| 2022/0368708 | A1* | 11/2022 | Maeda | H04L 63/1466 |

OTHER PUBLICATIONS

European Search Report and Written Opinion for the European Application No. 21183400, dated Dec. 13, 2021, 8 pages.

* cited by examiner

US 11,875,235 B2

MACHINE LEARNING VOLTAGE FINGERPRINTING FOR GROUND TRUTH AND CONTROLLED MESSAGE ERROR FOR MESSAGE AND ECU MAPPING

BACKGROUND

Communication networks are implemented in a variety of modern systems, such as, automotive, bus, train, industrial vehicle, agricultural vehicle, ship, aircraft, spacecraft, manufacturing, industrial, health devices/equipment, retail, or the like. Often, networking protocols are used to facilitate information communication between components in the system. For example, an in-vehicle network (IVN), like a CAN bus, can be used to provide a message-based protocol facilitating communication between electronic control units (e.g., microcontrollers, sensors, actuators, etc.). However, the increasingly high number of electronic control communication on such networks expose the systems to various types of security risks. Thus, identification of the device transmitting a message is important for an overall intrusion detection system (IDS). An IDS may be used to reduce risk of attacks aimed to disable, overtake, reprogram, or otherwise inhibit the safe operation of the system in which the network is deployed, such as, an automobile.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
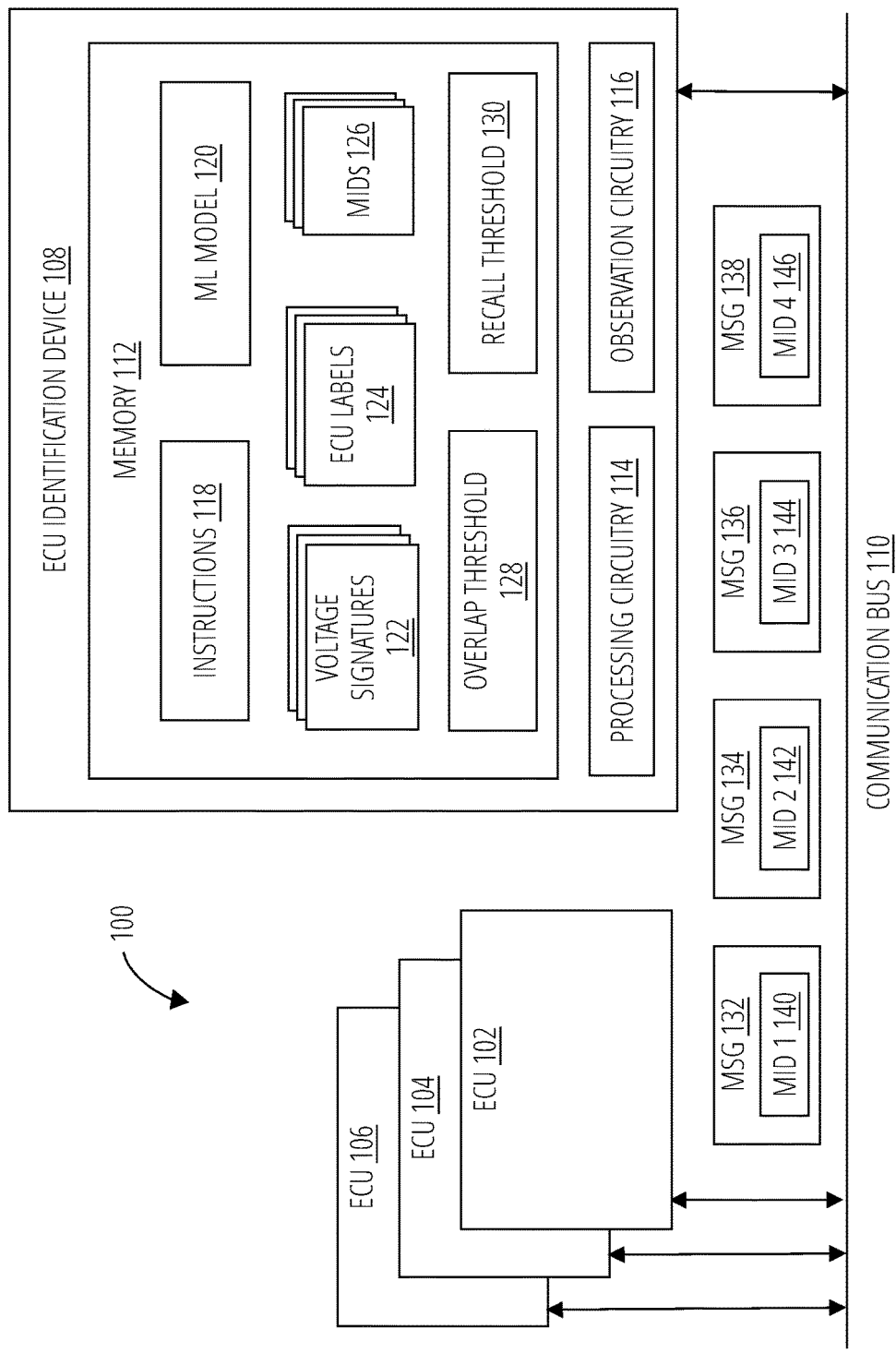
FIG. 1 illustrates a System 100 in accordance with one embodiment.

Various embodiments of the present disclosure provide for establishing a "ground truth" for electronic control units (ECUs) on a communication network after a context shift has occurred. In general, fingerprinting mechanisms must be retrained after each context shift. The present disclosure is directed towards establishing ground truth for ECUs coupled via a communication bus, which can be implemented in a variety of contexts, such as, for example, industrial networks, vehicular networks, manufacturing networks, retail operation networks, warehousing networks, or the like. Although vehicular networks are often used in this description as an example, the claims are not limited to in-vehicle networks.

However, using vehicles as an example, modern vehicles have many (often hundreds) of ECUs. These ECUs are communicatively coupled via an in-vehicle network (IVN), such as, as CAN bus. For example, there are multiple ECUs for engine control, transmission, airbags, antilock brakes, cruise control, electric power steering, audio systems, power windows, power doors, power mirror adjustment, battery, recharging systems for hybrid/electric cars, environmental control systems, auto start stop systems, blind spot monitoring, lane keeping assist systems, collision avoidance systems, and more complex systems in the case of autonomous, or semi-autonomous vehicles.

Physical characteristics of these ECUs are often used in fingerprinting schemes to mitigate the risk of malicious ECUs masquerading as a valid ECU. For example, during operation, the ECUs generate and transmit messages onto the IVN. Physical characteristics of these messages can be used to generate a fingerprint for each ECU. Subsequently, this fingerprint can be used to ensure that messages indicated as originating from a particular ECU (e.g., the anti-lock brake ECU, or the like) has indeed originated from the authentic ECU. In many intrusion detection systems (IDSs) machine learning (ML) models are trained to infer, or classify, messages to ECU labels.

The "ground truth" or accuracy of data used to train the ML models is highly correlated to the accuracy of the ML model during actual usage. Accordingly, establishing ground truth for such IDS systems is important for initial training of the ML model. Furthermore, where the system encounters a context shift, the accuracy of the ML model inference may degrade and no longer be valid. Said differently, a change in the physical environment in which the physical characteristics are measured can change the fingerprint of each ECU. For example, an automobile parked overnight will encounter a context shift (e.g., due to changes in temperature, humidity, cooling of vehicle components, or the like) that may affect the fingerprint of the ECUs in the automobile. As such, retraining of the ML model is often required after a context shift.

Establishing ground truth for purposes of training (or retraining) is complicated in that ML based fingerprinting often requires knowledge of all message identifications (MID) originating from all ECUs. This information is often proprietary knowledge. In many cases, the ECUs are supplied by different manufactures and as such knowledge of the proprietary information for each ECU in a system (e.g., automobile, or the like) may not be available to a single entity, even the manufacturer of the automobile itself. Accordingly, initial training as well as retraining (e.g., after a context shift, or the like) of ML models for an IDS is complicated by the fact that establishment of ground truth is not trivial without the above described information, which is often not available.

The present disclosure provides to establish ground truth (e.g., for initial training of an ML model or for retraining of an ML model) without prior knowledge of all ECU MIDs. In general, the present disclosure provides to iteratively collapse related or "overlapping" MIDs into a single ECU label. This is described in greater detail below.

FIG. 1 illustrates an example system 100, which can be implemented in a vehicle, such as, for example, an automobile, a motorcycle, an airplane, a boat, a personal watercraft, an all-terrain vehicle, or the like. As noted above, the present disclosure is applicable to other systems, besides vehicles, such as, for example, aerospace, industrial, or the like.

System 100 includes a number of electronic control units (ECUs), for example, ECU 102, ECU 104, and ECU 106 are depicted. System 100 further includes ECU identification device 108. System 100 includes a communication bus 110, which can be a CAN bus, a FlexRay bus, a CAN FD bus, an automotive ethernet bus, or a local interconnected network (LIN) bus. Additionally, where implemented in contexts outside of the automotive space, the communication bus 110 can be a network bus adapted to the particular implementation, such as, for example, a communication network for manufacturing equipment, or the like.

In general, each of ECU 102, ECU 104, and ECU 106 include circuitry arranged to generate messages and transmit the messages onto communication bus 110 and/or consume messages from communication bus 110. The depicted ECUs (e.g., ECU 102, ECU 104, and ECU 106) can be any of a variety of devices, such as, for example, sensor devices, actuator devices, microprocessor control devices, or the like. For example, the ECUs include circuitry arranged to manipulate voltage levels on communication bus 110 to communicate messages via the communication bus 110. As depicted, system 100 includes ECU 102, ECU 104, and ECU 106. This is done for clarity of presentation. However, in practice (e.g., in a modern automobile, or the like) hundreds of ECUs may be provided in system 100.

ECUs are arranged to generate and/or consume messages, where the messages can include data or commands. Specifically, ECUs can convey messages via communication bus 110. As such, messages are depicted on communication bus 110. In particular, this figure depicts a number of messages (MSGs), such as, message 132, message 134, message 136, and message 138. The number of messages is depicted for purposes of clarity and ease of explanation. Many IVN standards, however, do not provide for indicating source information on the bus. Furthermore, many IVN schemes do not have sufficient bandwidth for conventional cryptography techniques useful to indicate the source of messages.

As such, messages (e.g., 122, etc.) often include a message identification (MID) with which receivers can determine whether the message is relevant or not. In particular, message 132 is depicted including MID 1 140, message 134 is depicted including MID 2 142, message 136 is depicted including MID 3 144, and message 138 is depicted including MID 4 146.

ECU identification device 108 includes memory 112, processing circuitry 114, and observation circuitry 116. Memory 112 includes instructions 118 (e.g., firmware, or the like) that can be executed by processing circuitry 114 and/or observation circuitry 116. During operation, processing circuitry 114 can execute instructions 118 to consume messages (e.g., message 132, etc.) from communication bus 110. Furthermore, processing circuitry 114 can execute instructions 118 and/or machine learning (ML) model 120 to infer an ECU label 124 of ECU labels 124 associated with each consumed message to identify intrusions (e.g., masquerading ECUs, etc.) into 100 and/or communication bus 110.

Observation circuitry 116 can execute instructions 118 to observe a voltage signature on the communication bus 110 associated with the message. Memory 112 can store indications of the observed voltage signature as voltage signatures 122. An example of voltage signature can be voltage transitions or waveforms associated with a rising edge, a falling edge, or a steady state transition associated with transmitting a message (e.g., message 132, etc.) on communication bus 110.

The present disclosure is particularly directed towards establishing ground truth for training or retraining ML model 120. In some examples the disclosure can be applied to initially train ML model 120 while in other examples the disclosure can be applied to retrain ML model 120 after a context shift. Accordingly, processing circuitry 114 can execute instructions 118 to train or retrain ML model 120 without prior knowledge of all MIDs 126, where MIDs 126 include all MIDs, such as, MID 1 140, MID 2 142, MID 3 144, MID 4 146, etc.

Training and retraining of ML model 120 is described in greater detail below. However, in general processing circuitry 114 can execute instructions 118 to iteratively collapse MIDs from consumed messages into a single ECU label based on overlap threshold 128 and train ML model 120 using the collapsed MIDs until the trained (or retrained) ML model 120 has a recall less than recall threshold 130.

Processing circuitry 114 can include any of a variety of processors, such as, for example, commercial central processing units, application specific integrated circuits, or the like. Processing circuitry 114 can be a microprocessor or a commercial processor and can include one or multiple processing core(s) and can also include cache.

Observation circuitry 116 can include circuitry such as, analog to digital converters, voltage measurement circuitry, voltage waveform observation circuitry (e.g., oscilloscope circuitry, or the like) arranged to observe voltage transitions.

Memory 112 can be based on any of a wide variety of information storage technologies. For example, memory 112 can be based on volatile technologies requiring the uninterrupted provision of electric power or non-volatile technologies that do not require and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). Additionally, memory 112 can include storage devices.

ML model 120 can be any of a variety of machine learning models, decision trees, classification schemes, or the like. For example, ML model 120 can be a random forest model, a support vector machine, or a neural network.

Figure 2:
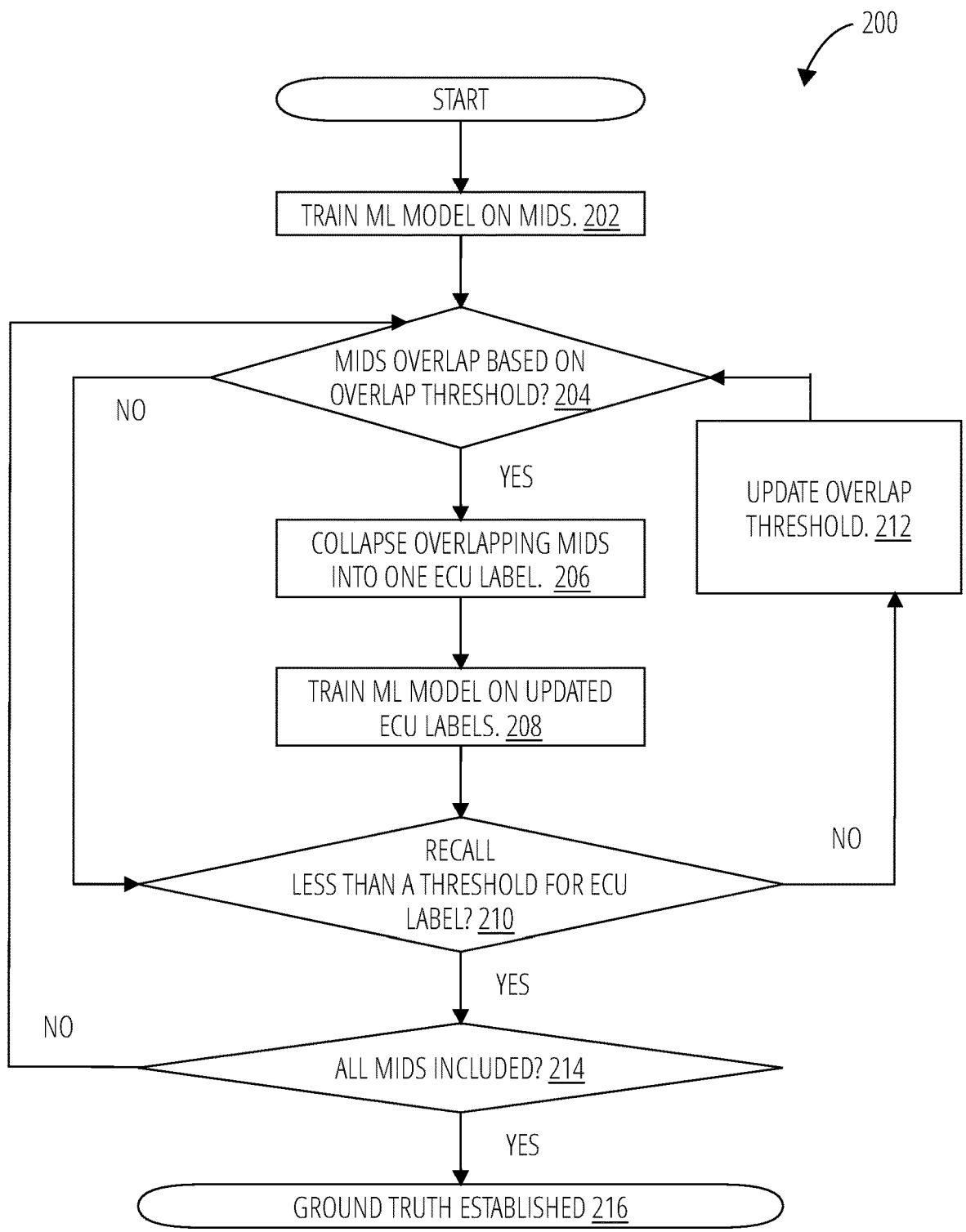
FIG. 2 illustrates an aspect of the subject matter in accordance with one embodiment.

FIG. 2 depicts a logic flow 200. Logic flow 200 can be implemented by an intrusion detection system (IDS), such as ECU identification device 108, to establish ground truth for initial training of an ML model (e.g., ML model 120, or the like) or after a context shift for retraining of an ML model (e.g., ML model 120, or the like). In some example, logic flow 200 can be implemented in a non-adversarial environment (e.g., original equipment manufacturer setting, or the like) where it is assumed that all ECUs are valid. The logic flows described herein, including logic flow 200 and other logic flows described herein, are representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Logic flow 200 may begin at block 202. At block 202 "train ML model on MIDs" circuitry can consume messages (e.g., message 132, etc.) from communication bus 110 and can train (or retrain) ML model 120 to recognize, or classify the messages as originating from one of the ECUs (e.g., ECU 102, etc.) based on voltage signatures 122 associated with the messages.

For example, processing circuitry 114 of ECU identification device 108, in executing instructions 118, can receive a number of messages (e.g., message 132, message 134, message 136, message 138, etc.) while observation circuitry 116, in executing instructions 118, can observe voltage signatures 122 associated with the message. Furthermore, observation circuitry 116 can execute instructions 118 to train (or retrain) ML model 120 to infer or classify an ECU label 124 from the voltage signatures 122.

Continuing to decision block 204 "MIDs overlap based on overlap threshold?" processing circuitry can determine whether the MIDs associated with each ECU label 124 overlap based on overlap threshold 128. For example, processing circuitry 114, in executing instructions 118, can determine whether the MIDs 126 associated with voltage signatures 122 used to train ML model 120 (e.g., at block 202) overlap based on overlap threshold 128. For example, processing circuitry 114, in executing instructions 118 can determine whether a first one of the MIDs 126 overlaps another one (e.g., a second one, or the like) of the MIDs 126 based on overlap threshold 128. As used herein, the phrase "ones of the MIDs" or "ones of the plurality of MIDs" is intended to mean two or more of the MIDs (e.g., a first one and a second one, or the like).

Figure 3:
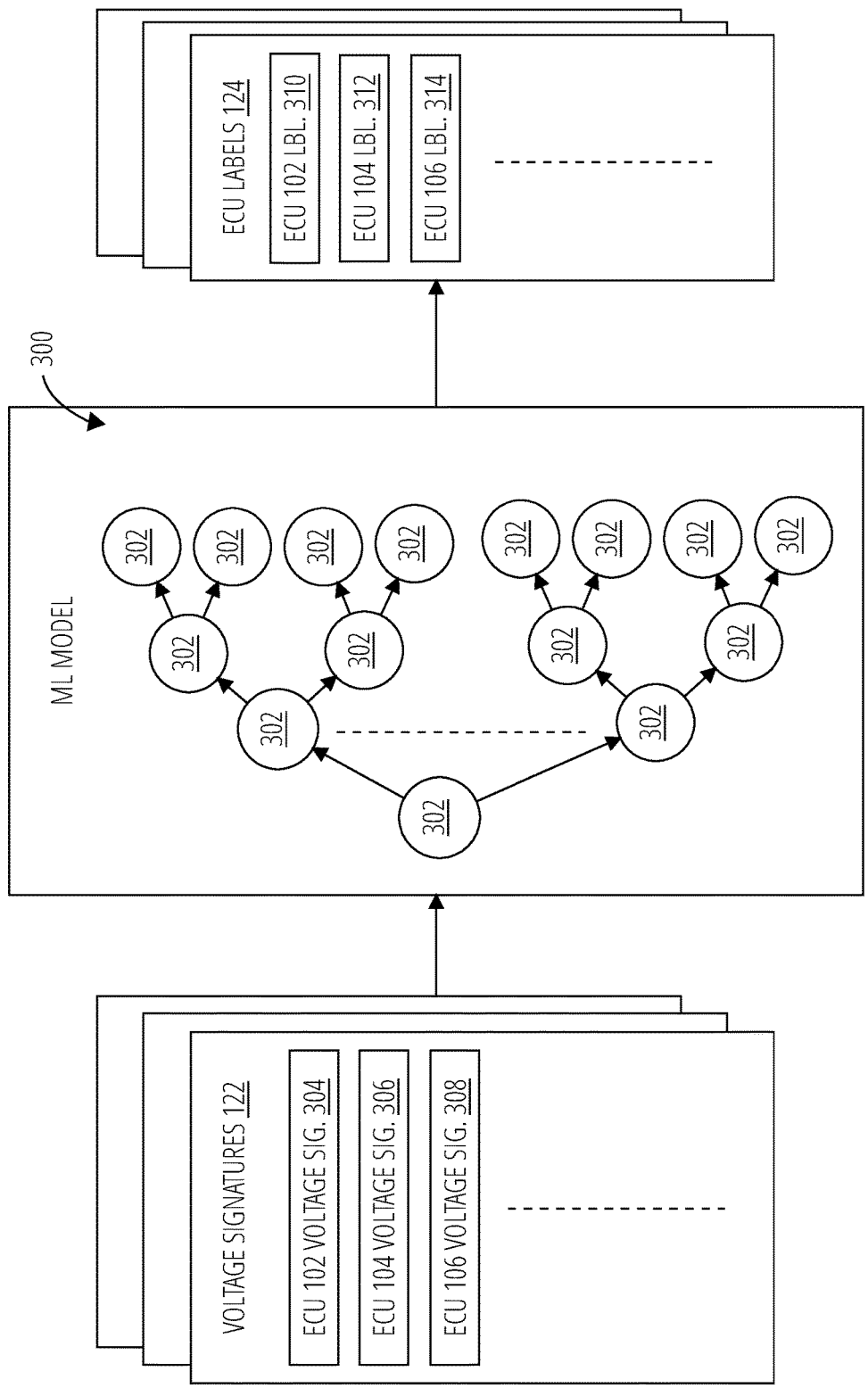
FIG. 3 illustrates an aspect of the subject matter in accordance with one embodiment.

This is described in greater detail below with respect to FIG. 3, FIG. 4A, and FIG. 4B. However, as an example, assume ML model 120 is trained to classify MIDs [x, y, z] as "label A" and MIDs [a, b, c] as "label B." Further assume that it is observed that MIDs a and b are misclassified as "label A" some percentage (e.g., 95%, or the like) of the time. If the observed percentage (e.g., 95%) is greater than the overlap threshold 128 (e.g., assume this is 90%), then the MIDs a and b are collapsed into "label A."

It is to be appreciated that the starting value for overlap threshold 128 may be arbitrary. In general, it is desired that an improvement (e.g., as will be described with respect to block 210 below) is observed. However, where an improvement is not observed the overlap threshold can be reduced (or increased) (e.g., at block 212).

From decision block 204, logic flow 200 can continue to block 206 or can skip to decision block 210. In particular, logic flow 200 can continue to block 206 based on a determination at decision block 204 that ones of MIDs 126 overlap based on overlap threshold 128 while logic flow 200 can skip to decision block 210 based on a determination at decision block 204 that ones of MIDs 126 do not overlap based on overlap threshold 128.

At block 206 "collapse overlapping MIDs into one ECU label" processing circuitry collapses overlapping MIDs into a single one of ECU labels 124. For example, processing circuitry 114 can execute instructions 118 to collapse overlapping ones of MIDs 126 into a single one of ECU labels 124. More specifically, an updated mapping between the MID voltage signatures and ECU labels is generated where ones of the MID voltage signatures are collapsed into a single ECU label (e.g., refer to FIGS. 4A and 4B).

Continuing to block 208 "train ML model on updated ECU labels" circuitry can train (or retrain) ML model 120 to recognize, or classify the messages as originating from one of the ECUs (e.g., ECU 102, etc.) based on voltage signatures 122 associated with the messages and the updated ECU labels 124 (e.g., updated based on collapsed MIDs 126).

At decision block 210 "recall less than a threshold for ECU label?" processing circuitry can determine whether recall of the ML model 120 is less than a threshold recall level for each ECU label. More particularly, processing circuitry 114 can execute instructions 118 to determine whether the recall for ML model 120 is less than recall threshold 130. It is to be appreciated, that the term recall as used herein is the number of members of a class (e.g., ECU label 124) that the classifier (e.g., ML model 120) identified correctly divided by the total number of members in that class. Although recall and recall threshold are used herein to evaluate when to stop iteratively collapsing MIDs, other metrics of ML model accuracy could be used, such as, precision, F1 score, or the like. From decision block 210, logic flow 200 can continue to block 212 or can continue to decision block 214. In particular, logic flow 200 can continue to block 212 based on a determination at decision block 210 that the recall threshold of ML model 120 is not less than recall threshold 130 while logic flow 200 can continue to decision block 214 based on a determination at decision block 210 that the recall threshold of ML model 120 is less than recall threshold 130.

At block 212 "update overlap threshold" processing circuitry can update the overlap threshold. For example, processing circuitry 114 in executing instructions 118 can update overlap threshold 128. In general, during iterations of logic flow 200, processing circuitry 114 can increase the overlap threshold to continue collapsing adjacent or overlapping MIDs as described herein.

At decision block 214 "all MIDs included?" processing circuitry can determine whether all MIDs have been included. Said differently, update the ground truth. Said differently, processing circuitry can determine whether all MIDs for messages received have been included in the training (or retraining) of the ML model. For example, processing circuitry 114 can execute instructions 118 to determine whether all MIDs (e.g., MID 1 140, MID 2 142, MID 3 144, MID 4 146, etc.) are included in the training (or retraining) of ML model 120. In some examples, processing circuitry 114 can execute instructions 118 to observe and collect MIDs over a period of time to generate a list of MIDs (e.g., MIDs 126, or the like). It is to be appreciated that not all MIDs may be observed. For example, an MID related to a rarely used or interacted with system (e.g., emergency lights for an automobile, trunk open sensor, or the like) may not be observed often. However, as new or unseen MIDs are observed they can be added to the list. As such, during operation, it can be determined (e.g., at block 214) whether all (or a percentage of) the MIDs on the list have been observed.

From decision block 214, logic flow 200 can continue to done block 216 or can return to decision block 204. In particular, logic flow 200 can continue to done block 216 based on a determination at decision block 214 that all MIDs are included while logic flow 200 can return to decision block 204 based on a determination at decision block 214 that all MIDs are not included.

At done block 216 "ground truth established" processing circuitry can establish ground truth. For example, processing circuitry 114 can execute instructions 118 to set the trained ML model 120 (or ML model 120 as retrained) as the ml model for classification by ECU identification device 108 during operation of system 100.

As noted, the present disclosure is directed towards establishing ground truth for an IDS employing an ML model to fingerprint ECUs. As such, example ML models are depicted in FIG. 3, FIG. 4A, and FIG. 4B. It is noted that these ML models are illustrated for purposes of clarity of presentation only and the focus of the description is on the inputs and outputs and establishing ground truth as opposed to discussing the intricacies of the ML model paradigm, training routines, or inference modeling. FIG. 3 depicts an example ML model 300 that could be deployed at implementation of an IDS, such as, ECU identification device 108. ML model 300 includes a number of interconnected nodes 302. As a particular example, ML model 300 could be based on the random forest ML scheme where the nodes are trees within the model.

ML model 300 is arranged to receive a voltage signature 122 as input and to infer an ECU label 124 from the voltage signature 122. For example, FIG. 3 depicts voltage signatures 122 including ECU 102 voltage sig. 304, ECU 104 voltage sig. 306, and ECU 106 voltage sig. 308. Furthermore, FIG. 3 depicts ECU labels 124 including ECU 102 lbl. 310, ECU 104 lbl. 312, and ECU 106 lbl. 314. Accordingly, circuitry (e.g., processing circuitry 114 of ECU identification device 108, or the like) can execute instructions (e.g., instructions 118, or the like) to infer an ECU label 124 (e.g., ECU 102 lbl. 310) from a voltage signature 122 (e.g., ECU 102 voltage sig. 304) based on ML model 300.

However, as noted, prior to initial training or with a context shift ML model 300 may not be accurate. For example, when context shifts occur (e.g., power cycle event, turned off overnight, or the like) the voltage signatures for each ECU, which are used as inputs to the ML model 300, may change enough that the ML model 300 needs to be retrained to account for the context shift. As another example, as the same ECU may transmit messages for different MIDs, the MIDs may have identical physical voltage signatures. Still, in another example, an ECU may send different (or new) MIDs after a firmware update. As such, ML models trained on such a data set will likely have low accuracy or an overlap in the recall score for these MIDs having similar physical voltage signatures. As such, the present disclosure provides to collapse (or group) these MIDs together to establish ground truth for training or retraining of an ML model.

Figure 4A:
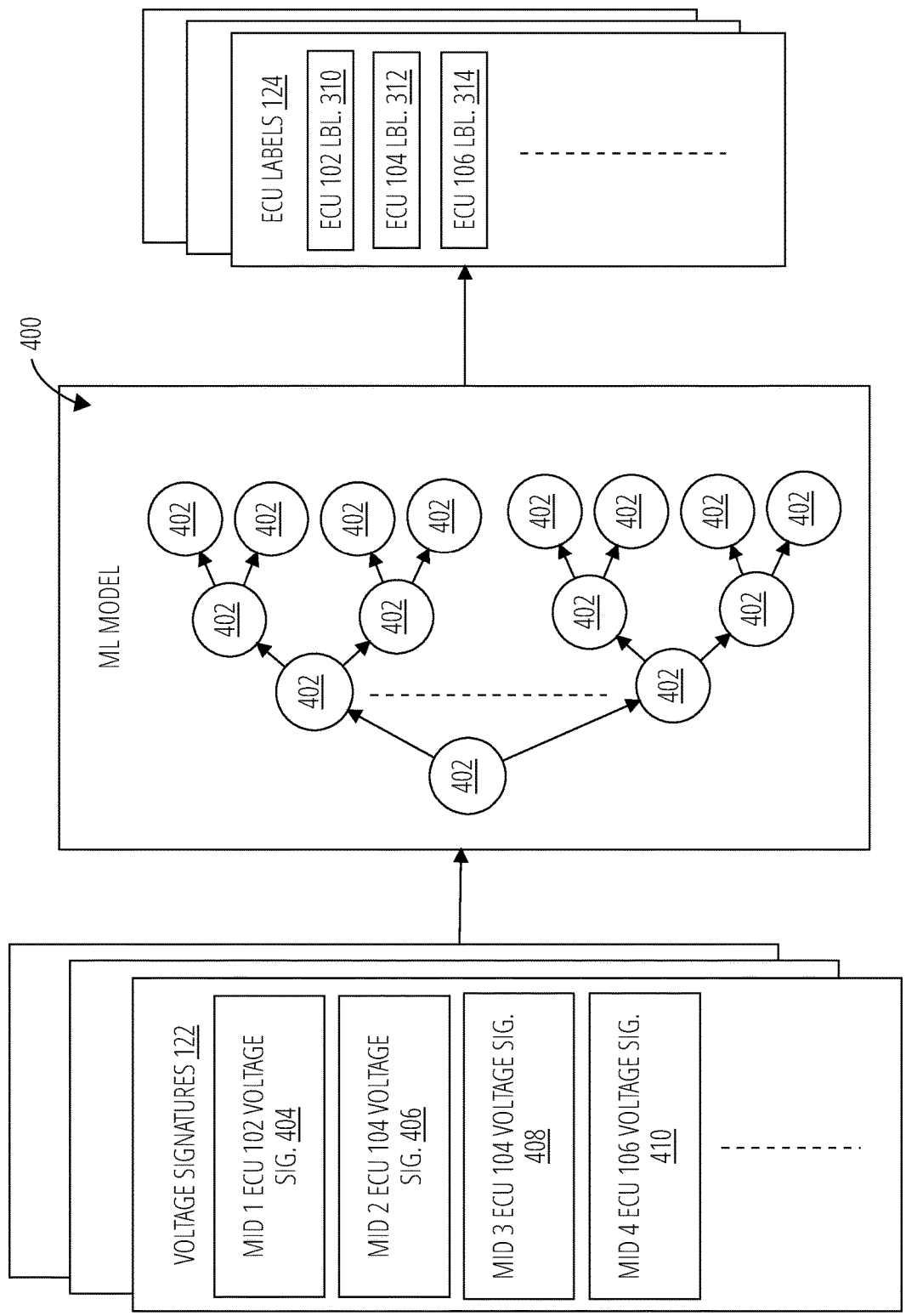
FIG. 4A illustrates an aspect of the subject matter in accordance with one embodiment.

FIG. 4A depicts ML model 400, which can be ML model 300 trained (or retrained) to establish ground truth as described herein. For example, ML model 400 includes interconnected nodes 402. It is noted that nodes 402 are depicted in the same quantity and arrangement as nodes 302. However, this is done for purposes of clarity of presentation and not intended to imply that the nodes 402 or their interconnectedness will not change during retraining.

Voltage signatures 122 are again used as input to ML model 400 while the ML model 400 infers ECU labels 124 from the voltage signatures 122. However, during establishment of ground truth, the voltage signatures 122 are based on messages (e.g., message 132, etc.) transmitted on the bus (e.g., communication bus 110) and can be classified by the message identification (MID) (e.g., MID 1 140, etc.) Accordingly, voltage signatures 122 are depicted including mid voltage signatures, such as, for example, MID 1 ECU 102 voltage sig. 404, MID 2 ECU 104 voltage sig. 406, MID 3 ECU 104 voltage sig. 408, and MID 4 ECU 106 voltage sig. 410. That is, ML model 400 is trained on a mapping between voltage signatures 122 and ECU labels 124.

As described herein, for example, with respect to FIG. 2 and the logic flow 200, ML model 400 (e.g., ML model 300 further trained, ML model 300 retrained, or the like) is trained on MID voltage signatures (e.g., block 202). Additionally, MID voltage signatures that overlap are collapsed into a single ECU label 124, or rather, the mapping between MID voltage signatures and ECU labels is updated. For example, MID 2 ECU 104 voltage sig. 406 and MID 3 ECU 104 voltage sig. 408 are depicted as voltage signatures 122 for the same ECU label (e.g., ECU 104 lbl. 312). As such, these MID voltage signatures can be collapsed and trained together for ECU 104 lbl. 312.

Figure 4B:
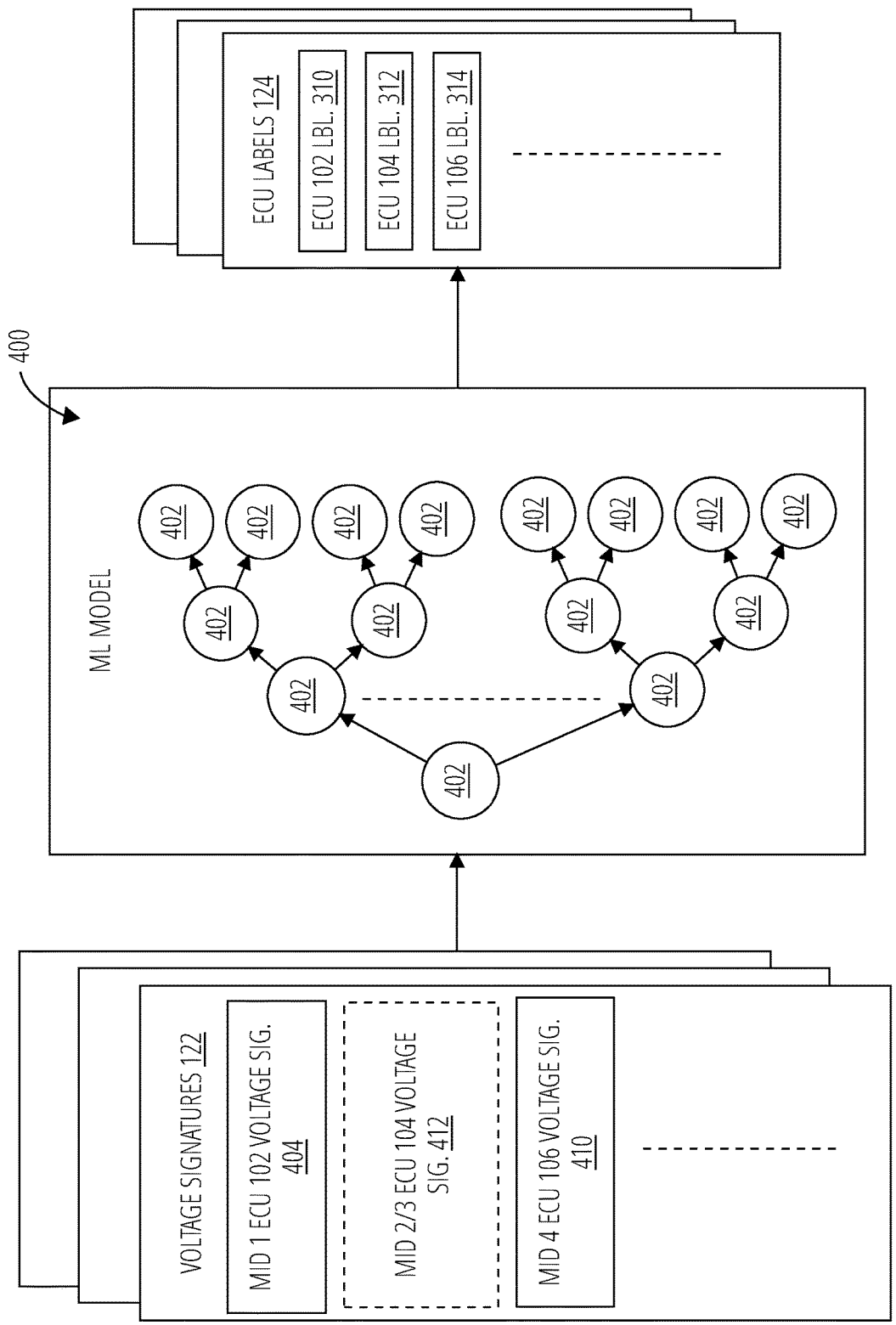
FIG. 4B illustrates an aspect of the subject matter in accordance with one embodiment.

FIG. 4B depicts ML model 400 during further training (or further retraining) where ones of the voltage signatures 122 have been collapsed and trained on a single ECU label 124, or rather, ML model 400 is trained on the updated mapping between voltage signatures 122 and ECU labels 124 depicted in FIG. 4B. For example, voltage signatures 122 is depicted including MID 1 ECU 102 voltage sig. 404 and MID 4 ECU 106 voltage sig. 410. However, voltage signatures 122 is also depicted including MID 2/3 ECU 104 voltage sig. 412 corresponding to the MIDs found in MID 2 ECU 104 voltage sig. 406 and MID 3 ECU 104 voltage sig. 408.

Figure 5:
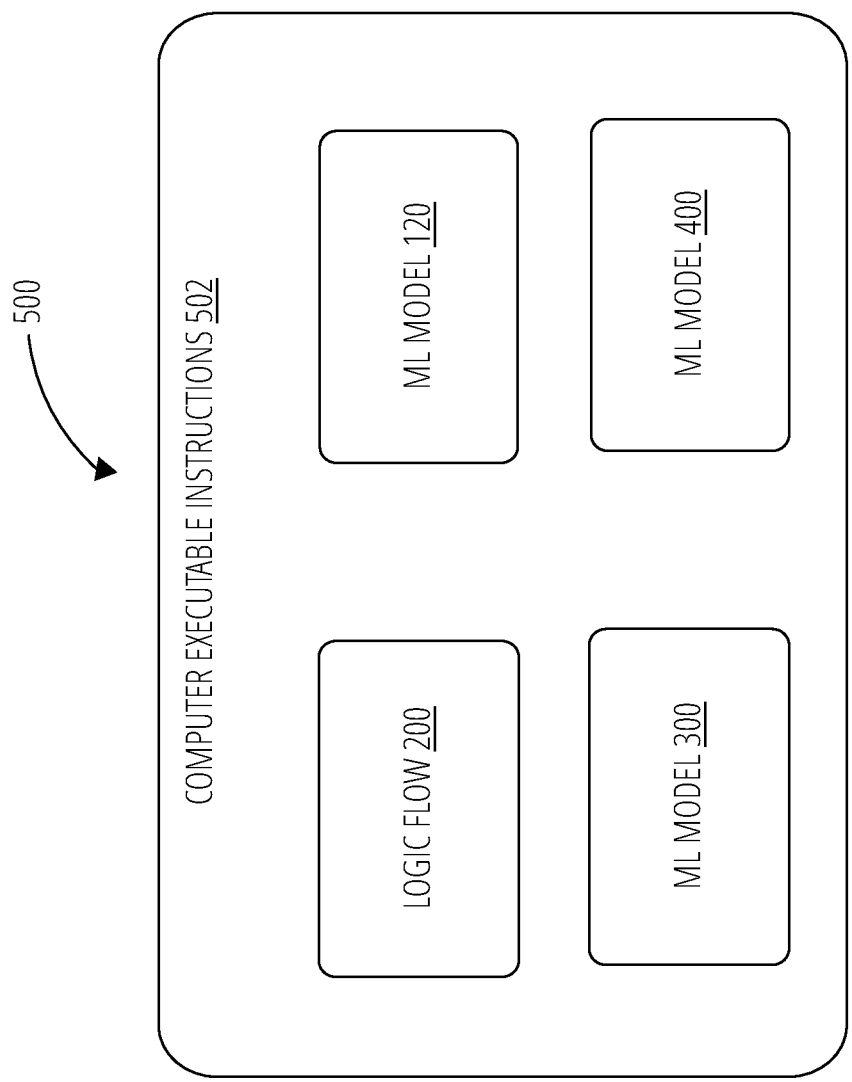
FIG. 5 illustrates a storage device 500 in accordance with one embodiment.

FIG. 5 illustrates an example of a storage device 500. Storage device 500 may comprise an article of manufacture, such as, any non-transitory computer readable medium or machine readable medium, such as an optical, magnetic or semiconductor storage. Storage device 500 may store various types of computer executable instructions 502, such as instructions to implement logic flow 200, ML model 120, ML model 300, and/or ML model 400. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 6:
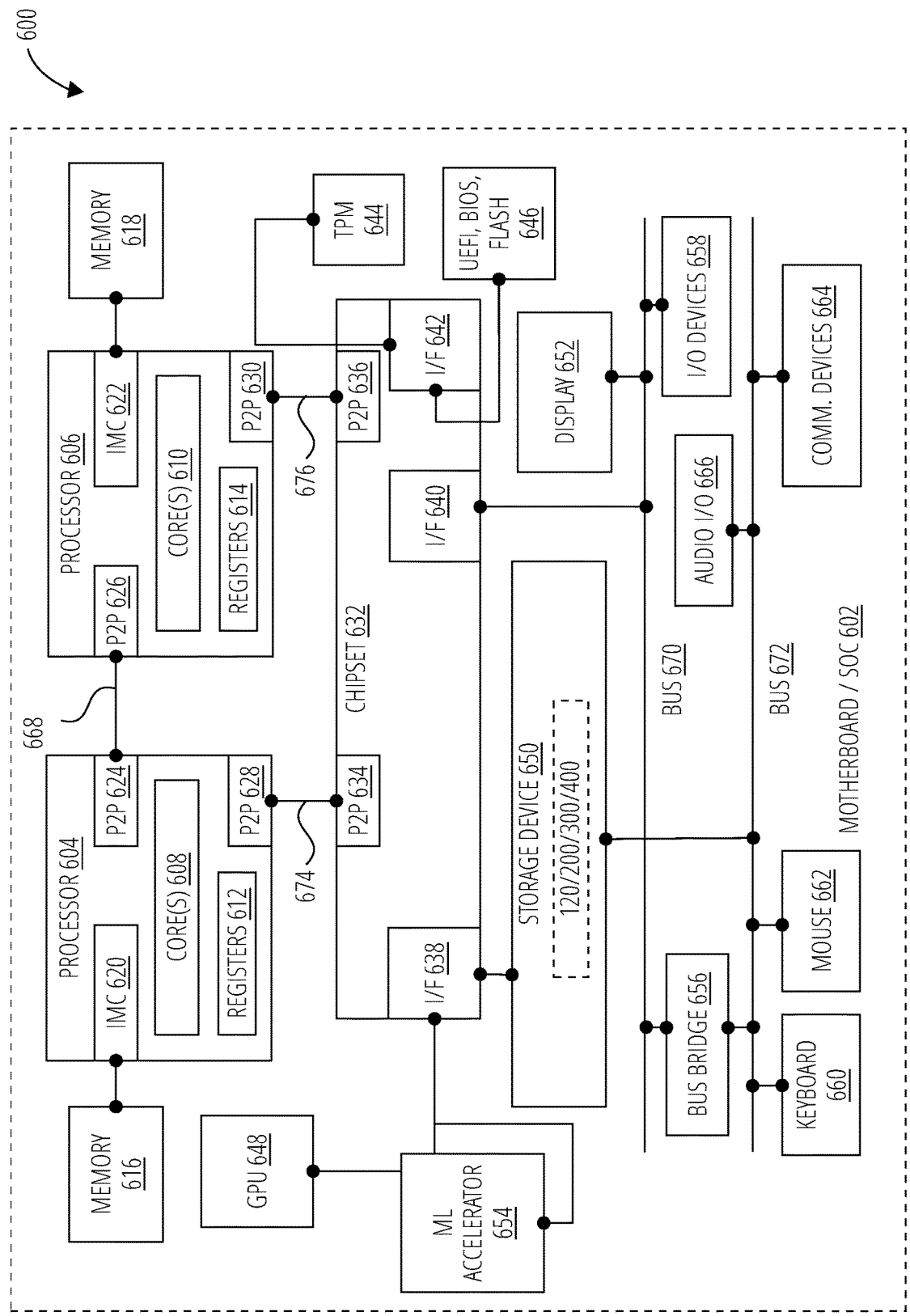
FIG. 6 illustrates an aspect of the subject matter in accordance with one embodiment.

FIG. 6 illustrates an embodiment of a system 600. System 600 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 600 may have a single processor with one core or more than one processor. Note that the term "processor" refers to a processor with a single core or a processor package with multiple processor cores. In at least one embodiment, the computing system 600 is representative of the components of the system 100. More generally, the computing system 600 is configured to implement all logic, systems, logic flows, methods, apparatuses, and functionality described herein with reference to FIG. 1 to FIG. 4B.

As used in this application, the terms "system" and "component" and "module" are intended to refer to a computer-related entity, either hardware, a combination of hardware and software, software, or software in execution, examples of which are provided by the exemplary system 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 600 comprises a motherboard or system-on-chip (SoC) 602 for mounting platform components. Motherboard or system-on-chip (SoC) 602 is a point-to-point (P2P) interconnect platform that includes a first processor 604 and a second processor 606 coupled via a point-to-point interconnect 668 such as an Ultra Path Interconnect (UPI). In other embodiments, the system 600 may be of another bus architecture, such as a multi-drop bus. Furthermore, each of processor 604 and processor 606 may be processor packages with multiple processor cores including core(s) 608 and core(s) 610, respectively. While the system 600 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 604 and chipset 632. Some platforms may include additional components and some platforms may only include sockets to mount the processors and/or the chipset. Furthermore, some platforms may not have sockets (e.g. SoC, or the like).

The processor 604 and processor 606 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi processor architectures may also be employed as the processor 604 and/or processor 606. Additionally, the processor 604 need not be identical to processor 606.

Processor 604 includes an integrated memory controller (IMC) 620 and point-to-point (P2P) interface 624 and P2P interface 628. Similarly, the processor 606 includes an IMC 622 as well as P2P interface 626 and P2P interface 630. Additionally, each of processor 604 and processor 606 may include registers 612 and registers 614, respectively. IMC 620 and IMC 622 couple the processors processor 604 and processor 606, respectively, to respective memories (e.g., memory 616 and memory 618). Memory 616 and memory 618 may be portions of the main memory (e.g., a dynamic random-access memory (DRAM)) for the platform such as double data rate type 3 (DDR3) or type 4 (DDR4) synchronous DRAM (SDRAM). In the present embodiment, the memories memory 616 and memory 618 locally attach to the respective processors (i.e., processor 604 and processor 606). In other embodiments, the main memory may couple with the processors via a bus and shared memory hub.

System 600 includes chipset 632 coupled to processor 604 and processor 606. Furthermore, chipset 632 can be coupled to storage device 650, for example, via an interface (I/F) 638. The I/F 638 may be, for example, a Peripheral Component Interconnect-enhanced (PCI-e).

Processor 604 couples to a chipset 632 via P2P interface 628 and P2P 634 while processor 606 couples to a chipset 632 via P2P interface 630 and P2P 636. Direct media interface (DMI) 674 and DMI 676 may couple the P2P interface 628 and the P2P 634 and the P2P interface 630 and P2P 636, respectively. DMI 674 and DMI 676 may be a high-speed interconnect that facilitates, e.g., eight Giga Transfers per second (GT/s) such as DMI 3.0. In other embodiments, the processor 604 and processor 606 may interconnect via a bus.

The chipset 632 may comprise a controller hub such as a platform controller hub (PCH). The chipset 632 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 632 may comprise more than one controller hub such as a chipset with a memory controller hub, a graphics controller hub, and an input/output (I/O) controller hub.

In the depicted example, chipset 632 couples with a trusted platform module (TPM) 644 and UEFI, BIOS, FLASH circuitry 646 via I/F 642. The TPM 644 is a dedicated microcontroller designed to secure hardware by integrating cryptographic keys into devices. The UEFI, BIOS, FLASH circuitry 646 may provide pre-boot code.

Furthermore, chipset 632 includes the I/F 638 to couple chipset 632 with a high-performance graphics engine, such as, graphics processing circuitry or a graphics processing unit (GPU) 648. In other embodiments, the system 600 may include a flexible display interface (FDI) (not shown) between the processor 604 and/or the processor 606 and the chipset 632. The FDI interconnects a graphics processor core in one or more of processor 604 and/or processor 606 with the chipset 632. Additionally, ML accelerator 654 coupled to chipset 632 via I/F 638. ML accelerator 654 can be circuitry arranged to execute ML related operations (e.g., training, inference, etc.) for ML models. In particular, ML accelerator 654 can be arranged to execute mathematical operations and/or operands useful for machine learning.

Various I/O devices 658 and display 652 couple to the bus 670, along with a bus bridge 656 which couples the bus 670 to a second bus 672 and an I/F 640 that connects the bus 670 with the chipset 632. In one embodiment, the second bus 672 may be a low pin count (LPC) bus. Various devices may couple to the second bus 672 including, for example, a keyboard 660, a mouse 662 and communication devices 664.

Furthermore, an audio I/O 666 may couple to second bus 672. Many of the I/O devices 658 and communication devices 664 may reside on the motherboard or system-on-chip (SoC) 602 while the keyboard 660 and the mouse 662 may be add-on peripherals. In other embodiments, some or all the I/O devices 658 and communication devices 664 are add-on peripherals and do not reside on the motherboard or system-on-chip (SoC) 602.

Figure 7:
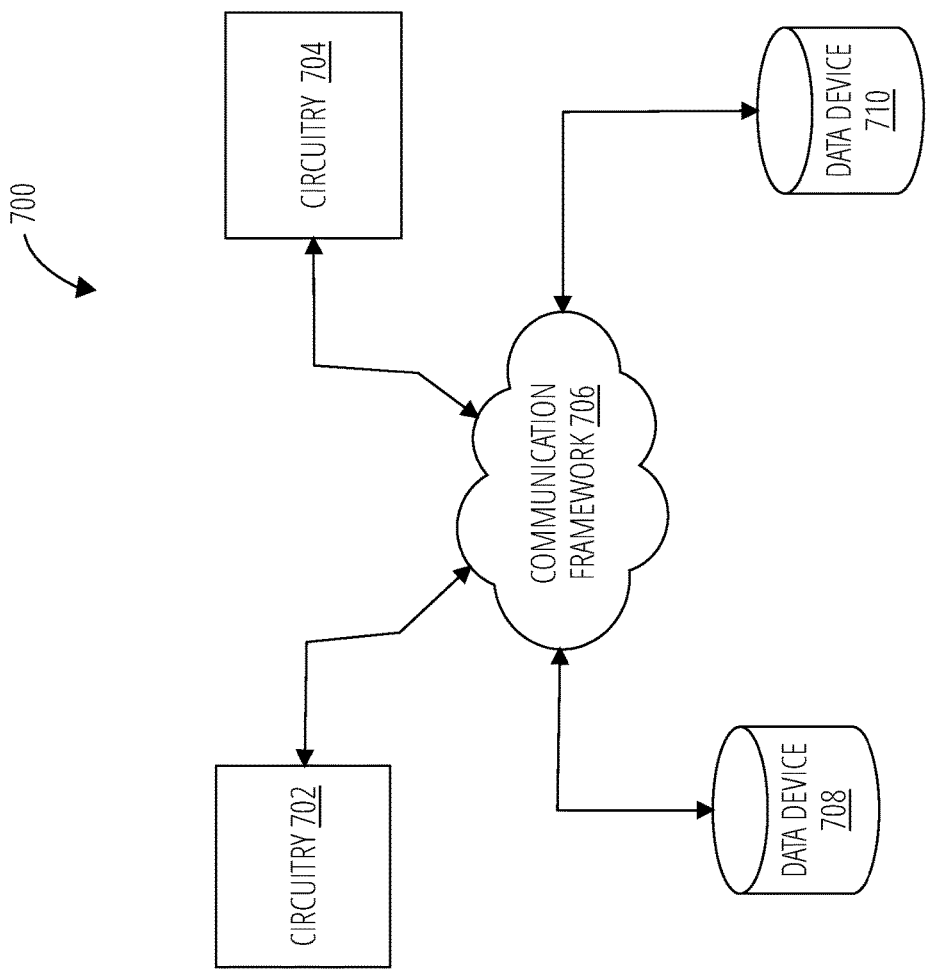
FIG. 7 illustrates an in-vehicle communication architecture 700 in accordance with one embodiment.

FIG. 7 illustrates an in-vehicle communication architecture 700 according to one or more embodiments of the disclosure. For example, one or more vehicular devices, components, or circuits, such as circuitry 702 and/or circuitry 704, may communicate with each other via a communications framework 706, which may be an in-vehicle network, such as a CAN bus, implemented to facilitate establishing ground truth for an IDS based on collapsing overlapping MID voltage signatures into a single ECU label.

The in-vehicle communication architecture 700 includes various common communications elements, such as a transmitter, receiver, transceiver, and so forth. The embodiments, however, are not limited to implementation by the in-vehicle communication architecture 700. As shown in this figure, the vehicular circuitry 702 and circuitry 704 may each be operatively connected to one or more respective data devices, such as, data device 708 and/or data device 710 that can be employed to store information local to the respective circuitry 702 and/or circuitry 704, such as fingerprints, distributions, densities, voltage signals, or the like. It may be understood that the circuitry 702 and circuitry 704 may be any suitable vehicular component, such as sensor, an ECU, microcontroller, microprocessor, processor, ASIC, field programmable gate array (FPGA), any electronic device, computing device, or the like. Moreover, it may be understood that one or more computing devices (containing at least a processor, memory, interfaces, etc.) may be connected to the communication framework 706 in a vehicle.

Further, the communication framework 706 may implement any well-known communications techniques and protocols. As described above, the communication framework 706 may be implemented as a CAN bus protocol or any other suitable in-vehicle communication protocol. The communication framework 706 may also implement various network interfaces arranged to accept, communicate, and connect to one or more external communications networks (e.g., Internet). A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. The communication framework 706 may employ both wired and wireless connections.

The components and features of the devices described above may be implemented using any combination of: processing circuitry, discrete circuitry, application specific integrated circuits (ASICs), logic gates and/or single chip architectures, etc. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

The following examples pertain to further embodiments, from which numerous permutations and configurations will be apparent.

Example 1. A computing apparatus comprising: a processor; and memory storing a machine learning (ML) model and instructions, the instructions when executed by the processor, configure the apparatus to: train the ML model to infer one of a plurality of electronic control unit (ECU) labels from voltage signatures associated with a plurality of message identifications (MIDs) of messages transmitted on a bus; determine whether ones of the plurality of MIDs overlap based on an overlap threshold; collapse overlapping ones of the plurality of MIDs into a one of the plurality of ECU labels to generate an updated mapping between MIDs and ECU labels responsive to a determination that ones of the plurality of MIDs overlap; and train the ML model on the updated mapping between the plurality MIDs and the plurality of ECU labels.

Example 2. The computing apparatus of example 1, the instructions when executed by the processor, configure the apparatus to determine whether an accuracy of the ML model is less than or equal to an accuracy threshold.

Example 3. The computing apparatus of example 2, the instructions when executed by the processor, configure the apparatus to: increase the overlap threshold responsive to a determination that the accuracy of the ML model is not less than or equal to the accuracy threshold; determine whether ones of the plurality of MIDs overlap based on the increased overlap threshold; collapse the overlapping ones of the plurality of MIDs into a one of the plurality of ECU labels to generate a second updated mapping between the plurality MIDs and the plurality of ECU labels responsive to a determination that ones of the plurality of MIDs overlap based on the increased overlap threshold; and train the ML model on the second updated mapping between the plurality MIDs and the plurality of ECU labels.

Example 4. The computing apparatus of example 2, the instructions when executed by the processor, configure the apparatus to determine whether all MIDs are included in updated mapping between the plurality MIDs and the plurality of ECU labels responsive to a determination that the accuracy of the ML model is less than or equal to the accuracy threshold.

Example 5. The computing apparatus of example 4, the instructions when executed by the processor, configure the apparatus to: determine whether any one of the plurality of MIDs overlap based on the overlap threshold responsive to a determination that all the MIDs are not included in the updated mapping between the plurality MIDs and the plurality of ECU labels; collapse overlapping ones of the plurality of MIDs into a one of the plurality of ECU labels to generate a second updated mapping between the plurality MIDs and the plurality of ECU labels responsive to a determination that ones of the MIDs overlap based on the increased overlap threshold; and train the ML model on the second updated mapping between the plurality MIDs and the plurality of ECU labels.

Example 6. The computing apparatus of example 4, the instructions when executed by the processor, configure the apparatus to deploy the trained ML model in an intrusion detection system (IDS) to establish ground truth for the intrusion detection system responsive to a determination that all MIDs are included in the second updated mapping between the plurality MIDs and the plurality of ECU labels.

Example 7. The computing apparatus of example 2, wherein the ML model is a supervised classifier.

Example 8. The computing apparatus of example 2, wherein the bus is an in-vehicle network.

Example 9. The computing apparatus of example 2, wherein the accuracy is a recall of the ML model, an F1 score of the ML model, or a precision of the ML model.

Example 10. A method, comprising: training a machine learning (ML) model to infer one of a plurality of electronic control unit (ECU) labels from voltage signatures associated with a plurality of message identifications (MIDs) of messages transmitted on a bus; determining whether ones of the plurality of MIDs overlap based on an overlap threshold; collapsing overlapping ones of the plurality of MIDs into a one of the plurality of ECU labels to generate an updated mapping between MIDs and ECU labels responsive to a determination that ones of the plurality of MIDs overlap; and training the ML model on the updated mapping between the plurality MIDs and the plurality of ECU labels.

Example 11. The method of example 10, comprising determining whether an accuracy of the ML model is less than or equal to an accuracy threshold.

Example 12. The method of example 11, comprising: increasing the overlap threshold responsive to a determination that the accuracy of the ML model is not less than or equal to the accuracy threshold; determining whether ones of the plurality of MIDs overlap based on the increased overlap threshold; collapsing the overlapping ones of the plurality of MIDs into a one of the plurality of ECU labels to generate a second updated mapping between the plurality MIDs and the plurality of ECU labels responsive to a determination that ones of the plurality of MIDs overlap based on the increased overlap threshold; and training the ML model on the second updated mapping between the plurality MIDs and the plurality of ECU labels.

Example 13. The method of example 11, comprising determining whether all MIDs are included in updated mapping between the plurality MIDs and the plurality of ECU labels responsive to a determination that the accuracy of the ML model is less than or equal to the accuracy threshold.

Example 14. The method of example 13, comprising: determining whether any one of the plurality of MIDs overlap based on the overlap threshold responsive to a determination that all the MIDs are not included in the updated mapping between the plurality MIDs and the plurality of ECU labels; collapsing overlapping ones of the plurality of MIDs into a one of the plurality of ECU labels to generate a second updated mapping between the plurality MIDs and the plurality of ECU labels responsive to a determination that ones of the MIDs overlap based on the increased overlap threshold; and training the ML model on the second updated mapping between the plurality MIDs and the plurality of ECU labels.

Example 15. The method of example 13, comprising training the ML model on the second updated mapping between the plurality MIDs and the plurality of ECU labels to increase an accuracy of the ML model.

Example 16. The method of example 11, wherein the ML model is a supervised classifier.

Example 17. The method of example 11, wherein the bus is an in-vehicle network.

Example 18. The method of example 15, wherein the accuracy is a recall of the ML model, an F1 score of the ML model, or a precision of the ML model.

Example 19. An apparatus, comprising means arranged to implement the function of any one of examples 10 to 18.

Example 20. A non-transitory computer-readable storage medium, the computer-readable storage medium including instructions that when executed by a computer, cause the computer to: train a machine learning (ML) model to infer one of a plurality of electronic control unit (ECU) labels from voltage signatures associated with a plurality of message identifications (MIDs) of messages transmitted on a bus; determine whether ones of the plurality of MIDs overlap based on an overlap threshold; collapse overlapping ones of the plurality of MIDs into a one of the plurality of ECU labels to generate an updated mapping between MIDs and ECU labels responsive to a determination that ones of the plurality of MIDs overlap; and train the ML model on the updated mapping between the plurality MIDs and the plurality of ECU labels.

Example 21. The computer-readable storage medium of example 20, comprising instructions that when executed by the computer, cause the computer to determine whether an accuracy of the ML model is less than or equal to an accuracy threshold.

Example 22. The computer-readable storage medium of example 21, comprising instructions that when executed by the computer, cause the computer to: increase the overlap threshold responsive to a determination that the accuracy of the ML model is not less than or equal to the accuracy threshold; determine whether ones of the plurality of MIDs overlap based on the increased overlap threshold; collapse the overlapping ones of the plurality of MIDs into a one of the plurality of ECU labels to generate a second updated mapping between the plurality MIDs and the plurality of ECU labels responsive to a determination that ones of the plurality of MIDs overlap based on the increased overlap threshold; and train the ML model on the second updated mapping between the plurality MIDs and the plurality of ECU labels.

Example 23. The computer-readable storage medium of example 21, comprising instructions that when executed by the computer, cause the computer to determine whether all MIDs are included in updated mapping between the plurality MIDs and the plurality of ECU labels responsive to a determination that the accuracy of the ML model is less than or equal to the accuracy threshold.

Example 24. The computer-readable storage medium of example 23, comprising instructions that when executed by the computer, cause the computer to: determine whether any one of the plurality of MIDs overlap based on the overlap threshold responsive to a determination that all the MIDs are not included in the updated mapping between the plurality MIDs and the plurality of ECU labels; collapse overlapping ones of the plurality of MIDs into a one of the plurality of ECU labels to generate a second updated mapping between the plurality MIDs and the plurality of ECU labels responsive to a determination that ones of the MIDs overlap based on the increased overlap threshold; and train the ML model on the second updated mapping between the plurality MIDs and the plurality of ECU labels.

Example 25. The computer-readable storage medium of example 23, comprising instructions that when executed by the computer, cause the computer to deploy the trained ML model in an intrusion detection system (IDS) to establish ground truth for the intrusion detection system responsive to a determination that all MIDs are included in the second updated mapping between the plurality MIDs and the plurality of ECU labels.

Example 26. The computer-readable storage medium of example 21, wherein the bus is an in-vehicle network.

Example 27. A system, comprising: a bus; a plurality of electronic control units (ECUs) coupled via the bus; a processor coupled to the bus; and a memory device coupled to the processor, the memory device storing a machine learning (ML) model and instructions, the instructions when executed by the processor, configure the system to: train the ML model to infer one of a plurality of electronic control unit (ECU) labels from voltage signatures associated with a plurality of message identifications (MIDs) of messages transmitted on a bus, the plurality of ECU labels corresponding to the plurality of ECUs; determine whether ones of the plurality of MIDs overlap based on an overlap threshold; collapse overlapping ones of the plurality of MIDs into a one of the plurality of ECU labels to generate an updated mapping between MIDs and ECU labels responsive to a determination that ones of the plurality of MIDs overlap; and train the ML model on the updated mapping between the plurality MIDs and the plurality of ECU labels.

Example 28. The system of example 27, the instructions when executed by the processor, configure the apparatus to determine whether an accuracy of the ML model is less than or equal to an accuracy threshold.

Example 29. The system of example 28, the instructions when executed by the processor, configure the apparatus to: increase the overlap threshold responsive to a determination that the accuracy of the ML model is not less than or equal to the accuracy threshold; determine whether ones of the plurality of MIDs overlap based on the increased overlap threshold; collapse the overlapping ones of the plurality of MIDs into a one of the plurality of ECU labels to generate a second updated mapping between the plurality MIDs and the plurality of ECU labels responsive to a determination that ones of the plurality of MIDs overlap based on the increased overlap threshold; and train the ML model on the second updated mapping between the plurality MIDs and the plurality of ECU labels.

Example 30. The system of example 29, the instructions when executed by the processor, configure the apparatus to determine whether all MIDs are included in updated mapping between the plurality MIDs and the plurality of ECU labels responsive to a determination that the accuracy of the ML model is less than or equal to the accuracy threshold.

Example 31. The system of example 30, the instructions when executed by the processor, configure the apparatus to: determine whether any one of the plurality of MIDs overlap based on the overlap threshold responsive to a determination that all the MIDs are not included in the updated mapping between the plurality MIDs and the plurality of ECU labels; collapse overlapping ones of the plurality of MIDs into a one of the plurality of ECU labels to generate a second updated mapping between the plurality MIDs and the plurality of ECU labels responsive to a determination that ones of the MIDs overlap based on the increased overlap threshold; and train the ML model on the second updated mapping between the plurality MIDs and the plurality of ECU labels.

Example 32. The system of example 30, the instructions when executed by the processor, configure the apparatus to deploy the trained ML model in an intrusion detection system (IDS) to establish ground truth for the intrusion detection system responsive to a determination that all MIDs are included in the second updated mapping between the plurality MIDs and the plurality of ECU labels.

Example 33. The system of example 29, wherein the ML model is a supervised classifier.

Example 34. The system of example 29, wherein the bus is an in-vehicle network.

Example 35. The system of example 29, wherein the accuracy is a recall of the ML model, an F1 score of the ML model, or a precision of the ML model.

Example 36. The system of example 28, wherein the plurality of ECUs comprise one or more of an engine control ECU, a transmission control ECU, an airbag control ECU, an antilock brakes control ECU, a cruise control ECU, an electric power steering ECU, an audio system ECU, a power windows ECU, a power doors ECU, a power mirror adjustment ECU, a battery monitor ECU, a recharging systems ECU, an environmental control system ECU, a blind spot monitoring ECU, a lane keeping assist system ECU, or a collision avoidance system ECU.

What is claimed is:

1. A computing apparatus comprising:
a processor; and
memory storing a machine learning (ML) model and instructions, the instructions when executed by the processor, configure the apparatus to:

train the ML model to infer one of a plurality of electronic control unit (ECU) labels from voltage signatures associated with a plurality of message identifications (MIDs) of messages transmitted on a bus;

determine whether a first one of the plurality of MIDs overlap at least a second one of the plurality of MIDs based on an overlap threshold, the overlap threshold to comprise a percentage value that represents an amount of time the first one of the plurality of MIDs or the at least second one of the plurality of MIDs is misclassified by the ML model;

collapse the first one of the plurality of MIDs and the at least the second one of the plurality of MIDs into a one of the plurality of ECU labels to generate an updated mapping between MIDs and ECU labels responsive to a determination that first one of the plurality of MIDs overlaps at least the second one of the plurality of MIDs; and train the ML model on the updated mapping between the plurality of MIDs and the plurality of ECU labels.

2. The computing apparatus of claim 1, the instructions when executed by the processor, configure the apparatus to determine whether an accuracy of the ML model is less than or equal to an accuracy threshold.

3. The computing apparatus of claim 2, the instructions when executed by the processor, configure the apparatus to:

increase the overlap threshold responsive to a determination that the accuracy of the ML model is not less than or equal to the accuracy threshold;

determine whether additional ones of the plurality of MIDs overlap based on the increased overlap threshold;

collapse the additional overlapping ones of the plurality of MIDs into a one of the plurality of ECU labels to generate a second updated mapping between the plurality of MIDs and the plurality of ECU labels responsive to a determination that additional ones of the plurality of MIDs overlap based on the increased overlap threshold; and train the ML model on the second updated mapping between the plurality of MIDs and the plurality of ECU labels.

4. The computing apparatus of claim 2, the instructions when executed by the processor, configure the apparatus to determine whether all MIDs are included in the updated mapping between the plurality of MIDs and the plurality of ECU labels responsive to a determination that the accuracy of the ML model is less than or equal to the accuracy threshold.

5. The computing apparatus of claim 4, the instructions when executed by the processor, configure the apparatus to:

determine whether additional ones of the plurality of MIDs overlap based on the overlap threshold responsive to a determination that all the MIDs are not included in the updated mapping between the plurality of MIDs and the plurality of ECU labels;

collapse the additional overlapping ones of the plurality of MIDs into a one of the plurality of ECU labels to generate a second updated mapping between the plurality MIDs and the plurality of ECU labels responsive to a determination that ones of the MIDs overlap based on an increased overlap threshold; and train the ML model on the second updated mapping between the plurality of MIDs and the plurality of ECU labels.

6. The computing apparatus of claim 4, the instructions when executed by the processor, configure the apparatus to deploy the trained ML model in an intrusion detection system (IDS) to establish ground truth for the intrusion detection system responsive to a determination that all MIDs are included in the second updated mapping between the plurality of MIDs and the plurality of ECU labels.

7. The computing apparatus of claim 2, wherein the ML model is a supervised classifier.

8. The computing apparatus of claim 2, wherein the bus is an in-vehicle network.

9. The computing apparatus of claim 2, wherein the accuracy is a recall of the ML model, an F1 score of the ML model, or a precision of the ML model.

10. A method, comprising:

training a machine learning (ML) model to infer one of a plurality of electronic control unit (ECU) labels based on a plurality of voltage signatures and a plurality of message identifications (MIDs) of messages transmitted on a bus;

determining whether two or more MIDs of the plurality of MIDs overlap based on an overlap threshold, the overlap threshold to comprise a percentage value that represents an amount of time that at least one of the two or more MIDs is misclassified by the ML model;

collapsing the two or more MIDs of the plurality of MIDs into a one of the plurality of ECU labels to generate an updated mapping between the MIDs, the voltage signatures, and the ECU labels responsive to a determination that the two or more MIDs of the plurality of MIDs overlap; and training the ML model on the updated mapping between the plurality of MIDs, the plurality of the voltage signatures, and the plurality of ECU labels.

11. The method of claim 10, comprising determining whether an accuracy of the ML model is less than or equal to an accuracy threshold.

12. The method of claim 11, comprising:

increasing the overlap threshold responsive to a determination that the accuracy of the ML model is not less than or equal to the accuracy threshold;

determining whether ones of the plurality of MIDs overlap based on the increased overlap threshold;

collapsing the overlapping ones of the plurality of MIDs into a one of the plurality of ECU labels to generate a second updated mapping between the plurality of MIDs and the plurality of ECU labels responsive to a determination that ones of the plurality of MIDs overlap based on the increased overlap threshold; and training the ML model on the second updated mapping between the plurality of MIDs and the plurality of ECU labels.

13. The method of claim 11, comprising determining whether all MIDs are included in updated mapping between the plurality of MIDs and the plurality of ECU labels responsive to a determination that the accuracy of the ML model is less than or equal to the accuracy threshold.

14. The method of claim 13, comprising:

determining whether any one of the plurality of MIDs overlap based on the overlap threshold responsive to a determination that all the MIDs are not included in the updated mapping between the plurality of MIDs and the plurality of ECU labels;

collapsing overlapping ones of the plurality of MIDs into a one of the plurality of ECU labels to generate a second updated mapping between the plurality of MIDs and the plurality of ECU labels responsive to a determination that ones of the MIDs overlap based on an increased overlap threshold; and training the ML model on the second updated mapping between the plurality of MIDs and the plurality of ECU labels.

15. The method of claim 14, comprising training the ML model on the second updated mapping between the plurality of MIDs and the plurality of ECU labels to increase an accuracy of the ML model.

16. The method of claim 15, wherein the accuracy is a recall of the ML model, an F1 score of the ML model, or a precision of the ML model.

17. The method of claim 11, wherein the ML model is a supervised classifier.

18. The method of claim 11, wherein the bus is an in-vehicle network.

19. A non-transitory computer-readable storage medium, the computer-readable storage medium including instructions that when executed by a computer, cause the computer to:

train a machine learning (ML) model to infer one of a plurality of electronic control unit (ECU) labels based on a plurality of voltage signatures, each voltage signature comprising one of a plurality of message identifications (MIDs) of messages transmitted on a bus;

determine whether two or more MIDs of the plurality of MIDs overlap based on an overlap threshold, the overlap threshold to comprise a percentage value that represents an amount of time that at least one of the two or more MIDs is misclassified by the ML model;

collapse the two or more MIDs of the plurality of MIDs into a one of the plurality of ECU labels to generate an updated mapping between MIDs and ECU labels responsive to a determination that the two or more MIDs of the plurality of MIDs overlap; and train the ML model on the updated mapping between the plurality of voltage signatures and the plurality of ECU labels.

20. The computer-readable storage medium of claim 19, comprising instructions that when executed by the computer, cause the computer to determine whether an accuracy of the ML model is less than or equal to an accuracy threshold.

21. The computer-readable storage medium of claim 20, comprising instructions that when executed by the computer, cause the computer to:

increase the overlap threshold responsive to a determination that the accuracy of the ML model is not less than or equal to the accuracy threshold;

determine whether ones of the plurality of MIDs overlap based on the increased overlap threshold;

collapse the overlapping ones of the plurality of MIDs into a one of the plurality of ECU labels to generate a second updated mapping between the plurality of MIDs and the plurality of ECU labels responsive to a determination that ones of the plurality of MIDs overlap based on the increased overlap threshold; and train the ML model on the second updated mapping between the plurality of voltage signatures and the plurality of ECU labels.

22. The computer-readable storage medium of claim 20, comprising instructions that when executed by the computer, cause the computer to determine whether all MIDs are included in updated mapping between the plurality of MIDs and the plurality of ECU labels responsive to a determination that the accuracy of the ML model is less than or equal to the accuracy threshold.

23. The computer-readable storage medium of claim 22, comprising instructions that when executed by the computer, cause the computer to:

determine whether any one of the plurality of MIDs overlap based on the overlap threshold responsive to a determination that all the MIDs are not included in the updated mapping between the plurality of MIDs and the plurality of ECU labels;

collapse overlapping ones of the plurality of MIDs into a one of the plurality of ECU labels to generate a second updated mapping between the plurality of voltage signatures and the plurality of ECU labels responsive to a determination that ones of the MIDs overlap based on an increased overlap threshold; and train the ML model on the second updated mapping between the plurality of voltage signatures and the plurality of ECU labels.

24. The computer-readable storage medium of claim 23, comprising instructions that when executed by the computer, cause the computer to deploy the trained ML model in an intrusion detection system (IDS) to establish ground truth for the intrusion detection system responsive to a determination that all MIDs are included in the second updated mapping between the plurality of voltage signatures and the plurality of ECU labels.

25. The computer-readable storage medium of claim 20, wherein the bus is an in-vehicle network.

\* \* \* \* \*